United States Patent

Speece

[15] 3,643,403
[45] Feb. 22, 1972

[54] DOWNFLOW BUBBLE CONTACT AERATION APPARATUS AND METHOD

[72] Inventor: Richard E. Speece, 6205 Shoal Creek Blvd., Austin, Tex. 78757

[22] Filed: Apr. 29, 1970

[21] Appl. No.: 32,846

[52] U.S. Cl. ..................................55/53, 55/196, 261/91, 261/93
[51] Int. Cl. ...........................................B01d 19/00
[58] Field of Search ....................55/53, 95, 196; 261/36, 84, 261/91, 93, 121, 71

[56] References Cited

UNITED STATES PATENTS

| | | | |
|---|---|---|---|
| 2,130,402 | 9/1938 | Textor | 261/93 |
| 3,476,366 | 12/1966 | Brooks et al. | 261/36 |
| 2,244,902 | 6/1941 | Stich | 261/93 X |
| 3,092,678 | 6/1963 | Braun | 261/93 X |

*Primary Examiner*—Reuben Friedman
*Assistant Examiner*—R. W. Burks
*Attorney*—Clarence A. O'Brien and Harvey B. Jacobson

[57] ABSTRACT

Oxygen deficient water is aerated by dispersing bubbles of air or oxygen gas in a forced downflow of water through a downwardly diverging funnel trapping the bubbles therein for prolonged contact with the water. The bubbles are displaced by crowding from the lower end of the funnel after some of the oxygen has been absorbed in the water and in some cases partially replaced by nitrogen gas stripped from the water.

11 Claims, 2 Drawing Figures

PATENTED FEB 22 1972

3,643,403

Richard E. Speece
INVENTOR.

BY Clarence A. O'Brien
and Harvey B. Jacobson
Attorneys

DOWNFLOW BUBBLE CONTACT AERATION APPARATUS AND METHOD

This invention relates to improving the quality of water which has deteriorated due to depletion of dissolved oxygen. More particularly, the present invention involves aerating bodies of water by increasing the dissolved oxygen concentration.

Bodies of water such as impoundments used for the generation of hydroelectric power undergo seasonal stratification, some of the consequences of which are detrimental. For example, the hypolimnion, the colder layer of water on the bottom, deteriorates due to the depletion of dissolved oxygen. This phenomena may be a serious detriment to downstream fishery. The oxygen deficiency in the hypolimnion results from microbic activity enhanced by a lack of reaeration. In order to control water quality in such stratified impoundments, oxygen must be added in order to maintain an aerobic environment.

Various methods are known for controlling water quality including destratification and hypolimnion aeration. Hypolimnion aeration is often preferred over destratification since it does not destroy the cold water reserve and nutrient recycling is avoided. Also, a lower volume of water is involved. The present invention may be applied to hypolimnion aeration utilizing commercial oxygen or air. Thus, in accordance with the present invention, a downward flow of water is induced through an expanding cross section chamber or funnel so that the velocity of the liquid decreases from the upper inlet and to the lower outlet end. Gas is injected into the liquid downflow by a disperser adjacent the upper inlet end. At this location the downward flow velocity of the liquid exceeds the upward buoyant velocity of the bubbles thereby preventing escape of the bubbles from the upper inlet end. The flow velocity of the liquid at the lower end however, is less than that required to prevent upflow of the bubbles. Thus, the bubbles are "trapped" within the funnel chamber for prolonged contact with the water and efficient gas absorption is achieved. Where the gas bubbles are composed of commercial oxygen, the liquid absorbs the oxygen while dissolved nitrogen is stripped therefrom in the case of natural waters. Further, because of the continuous injection of the gas bubbles, they are eventually displaced from the lower outlet end of the funnel chamber due to "crowding." The funnel chamber is dimensioned in accordance with the gas injection rate and the downflow velocity of the liquid so that the composition of the gas bubbles when displaced at the lower outward end of the funnel chamber will no longer be of any substantial value.

The apparatus and method of the present invention is particularly beneficial for water bodies of shallow depths because of the bubble "trapping" phenomena. Further, since nitrogen is stripped from the water simultaneously with the absorption of oxygen, toxic concentrations of dissolved nitrogen are reduced at the same time that the water quality is improved by the addition of oxygen. The method and apparatus of the present invention will therefore be useful for water quality management in general as well as for river reaeration for game fish.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
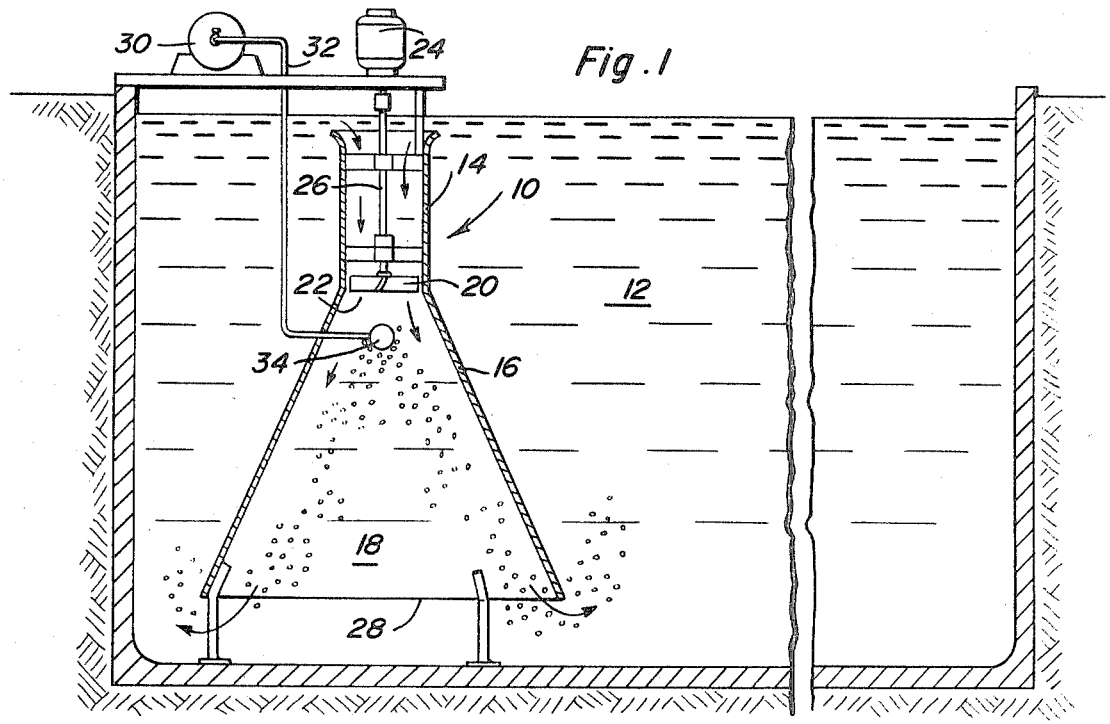
FIG. 1 is a simplified side sectional view showing one typical installation for the apparatus of the present invention.

Referring now to the drawings in detail, and initially to FIG. 1, the apparatus of the present invention generally denoted by reference numeral 10 is shown submerged within a body of water or impoundment 12 which is to be treated in accordance with the present invention. The apparatus includes a fixedly mounted intake tube 14 vertically positioned within the water and connected to the upper inlet end of a downwardly diverging funnel 16 of uniform slope as shown enclosing a flow chamber 18 having an increasing flow area in a downward direction.

A forced downflow of water through the flow chamber 18 is induced by rotation of an impeller 20 located at the upper inlet end 22 of the flow chamber. The impeller may be driven by any suitable prime mover such as the motor 24 mounted above the water surface and connected to the impeller by the shaft 26 extending downwardly through the intake tube 14. It will therefore be apparent, that a downflow stream of water will be conducted from the inlet end 22 of the flow chamber 18 to the larger outlet end 28 with the velocity of the water decreasing from a maximum value at the inlet end 22 to a minimum value at the outlet end 28.

A suitable source 30 of air or commercial oxygen under a static pressure greater than that of the water is provided and mounted at a suitable location for supply through the conduit 32 to a gas bubble disperser 34 located within the chamber 18 in spaced adjacency below the impeller 20 at the inlet end 22. Thus, gas bubbles are continuously injected into the downflow stream of water conducted through the flow chamber 18. The upward buoyant velocity of the gas bubbles emerging from the bubble disperser 34, is less than the downward velocity of the water so as to prevent any escape of bubbles from the upper end of the apparatus. This occurs because the bubbles are of such size as to have the requisite buoyant velocity relative to the decreasing flow velocity of the water. When utilizing a commercial bubble disperser, the bubble size is within a relatively narrow range. Further, it has been observed that the buoyant velocity remains substantially constant for bubbles within a considerably larger bubble size range than that associated with the bubble disperser. The bubbles are accordingly conveyed downwardly. However, as the bubbles approach the lower outlet end 28 of the flow chamber, the decreasing velocity of the downflow of water becomes less than the upward buoyant velocity of the bubbles. Accordingly, the gas bubbles are "trapped" inside the flow chamber for a prolonged contact time. Bubbles of relatively uniform size are eventually displaced from the lower end 28 of the flow chamber, out of the influence of the downflow, by virtue of the continuous injection of bubbles causing "crowding" of the bubbles at the lower outlet end.

Figure 2:
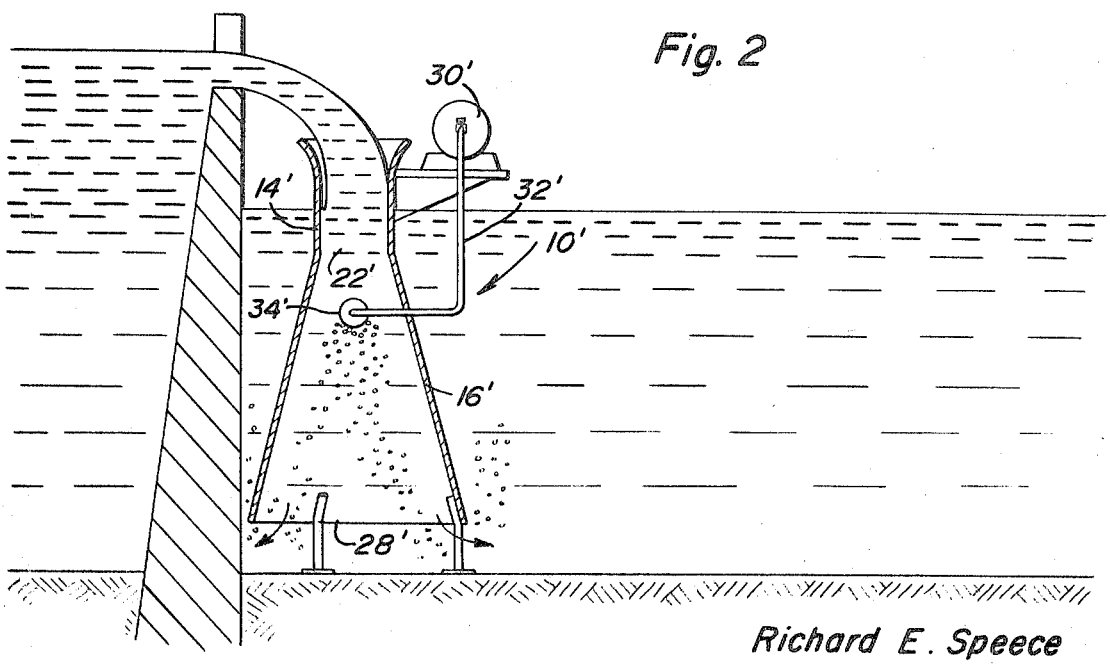
FIG. 2 is a simplified side sectional view showing another typical installation for the apparatus for the present invention.

FIG. 2 illustrates a modified form of apparatus 10' which is similar to the apparatus 10 illustrated in FIG. 1 except that the forced downflow of water through the funnel 16' is induced by a hydrostatic head. The apparatus 10' including the funnel is dimensioned in accordance with the velocity of the water resulting from the hydrostatic head of the water in the intake tube 14' producing the downward movement of gas bubbles from the disperser 34' to which air or commercial oxygen is supplied from the source 30' through the conduit 32'. Where sufficient hydrostatic head is available, the cascading water entering the intake tube 14' may entrain air bubbles to an extent eliminating the need for gas injection source 30'. In such case, the turbulence of the water will break up the air bubbles into smaller sizes so that when they reach the location of the bubble disperser 30', they will have the requisite buoyant velocity as described with respect to FIG. 1. As in the case of the apparatus 10, gas bubbles are displaced by "crowding" from the lower outlet end 28' of the funnel.

It is well known that absorption efficiency of gas bubbles by a liquid is a function of the contact time. Thus, efficient gas absorption occurs in the apparatus described because of the prolonged contact of substantially uniform size bubbles with the water. Utilizing commercially pure oxygen, the composition of the gas bubbles continuously changes from substantially 100 percent oxygen when initially injected from the disperser to lower fractions of oxygen and higher fractions of nitrogen gas stripped from the water. The flow chamber of the apparatus may therefore be designed to obtain a 90 percent absorption of the initial weight of oxygen within each bubble which by experiment coincides with a gas composition of approximately 21 percent oxygen and 79 percent nitrogen corresponding to that of air. Thus, the gas bubbles displaced from the lower end of the apparatus are no longer of any substantial value. Further, by proper dimensional design of the apparatus, it is possible to produce an effluent from the apparatus in which oxygen saturation with respect to air is exceeded when commercial oxygen is injected.

The apparatus as hereinbefore described may either be moved from one location to another or a plurality of apparatus set up in a grid in order to aerate an entire body of water. The apparatus may also be placed adjacent to the water intake from a lake in order to improve the quality of the water withdrawn. In addition to aeration of the hypolimnion of stratified impoundments the present invention is also applicable to stream reaeration and oxygen transfer into bodies of water having high-microbial activity, e.g., activated sludge waste water treatment and yeast fermentation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for dissolving gas by contact within a body of liquid exposed to atmosphere comprising means for producing a downflow within said body of liquid, flow confining means through which said downflow is conducted between inlet an outlet ends with a decreasing velocity from a maximum at the inlet end to a minimum at the outlet end, means for injecting bubbles of the gas into the downflow and means mounting the bubble injecting means at a predetermined location within the flow confining means for movement of the bubbles downwardly only toward the outlet end, the bubbles of gas entering the downflow being of a size having a buoyant velocity less than the maximum velocity of the downflow but greater than the minimum velocity at the outlet end.

2. The combination of claim 1 wherein said flow confining means forms a flow chamber of uniformly increasing flow area in a downward direction from the inlet end to the outlet end from which the bubbles escape.

3. The combination of claim 1 wherein said flow confining means comprises a downwardly diverging funnel entrapping said bubbles of gas between the inlet and outlet ends, said bubbles being displaced from the outlet end out of the influence of said downflow by continuous injection of bubbles.

4. The combination of claim 1 wherein said forced flow producing means includes power operated impeller means.

5. The combination of claim 1 wherein said forced flow producing means includes a source of water under a pressure head.

6. The combination of claim 1 wherein said means for injecting the bubbles of gas includes a source of gas under pressure and a bubble disperser connected to said source.

7. The combination of claim 1 wherein said means for injecting the bubbles includes a means for cascading water into the flow confining means under a hydrostatic head thereby entraining bubbles of air.

8. A method of dissolving and stripping gases from a body of water exposed to atmosphere including the steps of: inducing a downflow stream within said body of water of decreasing velocity; continuously injecting bubbles of a gas into said downflow stream; and confining said bubbles to a limited zone for downward movement only with the stream to prolong contact with the water, the water upstream of the limited zone having a velocity greater than the buoyant velocities of the bubbles thereby entrapping the bubbles downstream of the limited zone, the bubbles being displaced from the limited zone by said continuous injection thereof.

9. The method of claim 8 wherein said bubbles of gas includes oxygen progressively replaced by nitrogen during downward movement in the stream as the oxygen is absorbed by the water and the nitrogen is stripped therefrom.

10. The method of claim 9 wherein said bubbles are displaced from the limited zone when the oxygen content thereof is approximately 21 percent.

11. The method of claim 8 wherein said bubbles of gas are injected by cascading of water into the downflow stream under a hydrostatic head.

* * * * *